United States Patent

Wass

[11] Patent Number: 5,161,738
[45] Date of Patent: Nov. 10, 1992

[54] PRESSURE AND TEMPERATURE RELIEF VALVE WITH THERMAL TRIGGER

[76] Inventor: Lloyd G. Wass, 1670 Blackhawk Cove, Eagan, Minn. 55122

[21] Appl. No.: 707,596

[22] Filed: May 30, 1991

[51] Int. Cl.⁵ .................................... F16K 17/40
[52] U.S. Cl. .................... 236/92 C; 137/68.1; 137/72
[58] Field of Search ............... 236/92 C; 137/68.1, 137/72

[56] References Cited

U.S. PATENT DOCUMENTS

| | | | |
|---|---|---|---|
| 3,001,536 | 9/1961 | Casey | 137/72 X |
| 3,008,479 | 11/1961 | Mancusi, Jr. | 137/72 X |
| 3,010,520 | 11/1961 | Seaberg | 137/68.1 X |
| 3,633,596 | 1/1972 | Gerber | 137/68 |
| 3,730,204 | 5/1973 | Bissett | 137/68 |
| 3,896,835 | 7/1975 | Wicke | 137/72 X |
| 3,906,976 | 9/1975 | Nohr et al. | 220/89 B |
| 4,006,780 | 2/1977 | Zehr | 137/72 X |
| 4,083,187 | 4/1978 | Nagashima | 137/68.1 X |
| 4,195,745 | 4/1980 | Roberts et al. | 220/2.2 |
| 4,221,231 | 9/1980 | Harvey et al. | 137/72 |
| 4,228,858 | 10/1980 | Sclafani | 137/72 X |
| 4,430,392 | 2/1984 | Kelley et al. | 429/53 |
| 4,431,716 | 2/1984 | Eppley et al. | 137/68.1 X |
| 4,609,005 | 9/1986 | Upchurch | 137/68.1 |
| 4,744,382 | 5/1988 | Visnic et al. | 137/68.1 |
| 4,750,510 | 6/1988 | Short, III | 137/72 X |

Primary Examiner—William E. Tapolcai
Attorney, Agent, or Firm—Kinney & Lange

[57] ABSTRACT

A thermally activated relief valve is used with a compressed gas storage cylinder. A valve body has a passage for communication with the interior of the cylinder. A metal diaphragm sealing the passage has a first side exposed to the interior of the cylinder and a second side opposite the first side. A hollow bayonet is mounted to the valve body on the second side of the diaphragm. A spring is used to bias the bayonet toward the diaphragm. A thermal trigger is operably coupled to the bayonet for holding the bayonet in spaced relation to the diaphragm until the thermal trigger reaches a predetermined temperature threshold. Upon reaching the predetermined temperature threshold, the thermal trigger releases the bayonet so that the bayonet moves toward the diaphragm under force exerted by the spring and so that the bayonet pierces the diaphragm.

13 Claims, 3 Drawing Sheets

PRESSURE AND TEMPERATURE RELIEF VALVE WITH THERMAL TRIGGER

Reference is made to copending U.S. Pat. application Ser. No. 707,584, entitled CRASH PROOF SOLENOID CONTROLLED VALVE FOR NATURAL GAS POWERED VEHICLES by Lloyd G. Wass and Peter R. Nelson, filed concurrently herewith.

BACKGROUND OF THE INVENTION

The present invention relates to a relief valve. More particularly, the present invention relates to a combination pressure and thermally activated relief valve for use with a compressed gas storage cylinder (or pressure vessel).

It is desirable for some compressed gas storage cylinders to have safety valves such as a thermal relief device (TRD) and an over pressure relief device (PRD). For example, cylinders which hold compressed natural gas are required by law to have such relief valves.

In the past, such cylinders have used thermal relief valves which are activated when the body of the thermal relief valve exceeds a temperature threshold. For example, thermal relief valves of the prior art would typically have a passage which communicated with the interior of the cylinder. However, the passage would be filled (blocked) with a eutectic metal slug which remained solid below the predetermined melting temperature of the eutectic. Then, if the temperature of eutectic substance raised above the predetermined melting temperature, the slug would soften or melt. In its softened or weakened state, the eutectic substance would be forced out of the passage in the relief valve by the pressure of the gas in the cylinder. With the eutectic substance removed from the passage, the gas would be released through the passage to the external atmosphere or another suitable container.

However, such a relief valve was plagued by certain problems. The problems primarily resulted because the eutectic metal was exposed to the gas pressure in the cylinder. Under such pressure, the eutectic substance underwent what is known as plastic flow or creep. In other words, the gas pressure acting on the eutectic block over time would push some of the eutectic block out of the passage. Thus, even though no over-temperature condition existed, the thermal relief valve would be partially activated and leak. Since the eutectic substance, exposed to the gas pressure, was prone to plastic flow or creep, the life expectancy of such a thermal relief valve was relatively short. Thus, such relief valves need to be replaced more often than desirable.

Pressure relief devices have typically used a thin metal disc or wafer to block the flow passage. This disc simply ruptures when the gas pressure in the cylinder exceed a predetermined level.

Since pressure and thermal relief devices are typically incorporated into the cylinder shut off valve, it is desirable from cost and convenience standpoint to combine them.

Combination pressure relief and thermal relief devices have typically used a eutectic metal "slug" backed by a thin metal disc. Although this design solves the eutectic creep problem, it obviously requires a minimum gas pressure to rupture the disc, and has thus proven to be inoperative on partially filled cylinders. A letter warning against the use of this type of relief device was circulated by the United States and Canadian Gas Associations several years ago.

Since the eutectic creep problem is diminished with the use of smaller and/or partially restricted bores/openings, one solution is to simply limit the physical size of the TRD. While this is a perfectly practical solution for small volume cylinders, it is totally impractical for cylinders used on large trucks or buses. A recent CNG Urban Bus demonstration project utilizing three (3) long storage cylinders mounted on the bus roof required a total of twenty-seven (27) TRDs to meet the required emergency flow rate.

SUMMARY OF THE INVENTION

A combination PRD/TRD releases gas from a storage cylinder when either the gas pressure exceeds a certain level or the thermal trigger senses a predetermined temperature threshold, or both. A valve housing has a passage with an inlet for communication with the interior of the cylinder, and an outlet. A thin metal disc is disposed within the passage between the inlet and the outlet sealing the passage. For thermal activation, a spring-biased hollow bayonet is mounted within the passage between the disc and the outlet and is movable between a first position and a second position. In the first position, the bayonet is spaced from the disc, and in the second position, the bayonet pierces the disc. A thermal trigger is disposed generally between the seal and the outlet allowing the bayonet to move from the first position to the second position when the thermal trigger reaches the predetermined temperature threshold.

The incorporation of a bearing ball into the thermal trigger that doubles as a gas check valve allows a very small amount of soft metal eutectic to hold back a large spring force prior to thermal activation. This allows thermal activation of the TRD at any cylinder pressure while still allowing independent activation of the PRD.

Because the size of this device is not limited by eutectic creep problems, much larger bore (higher flow) units can be designed to meet the safety requirements of larger gas storage cylinders and permit optimization of larger fuel systems. Since the heat sensing element (thermal trigger) of this combination PRD/TRD is relatively small and is the only portion of the safety device that requires external exposure (aside from the outlet vent), the bulk of the device can be packaged internally in the gas storage cylinder. This is very important for vehicular systems application where "crash proofing" is highly desirable from an overall system safety standpoint.

DETAILED DESCRIPTION OF THE PREFERRED EMBODIMENTS

Figure 1:
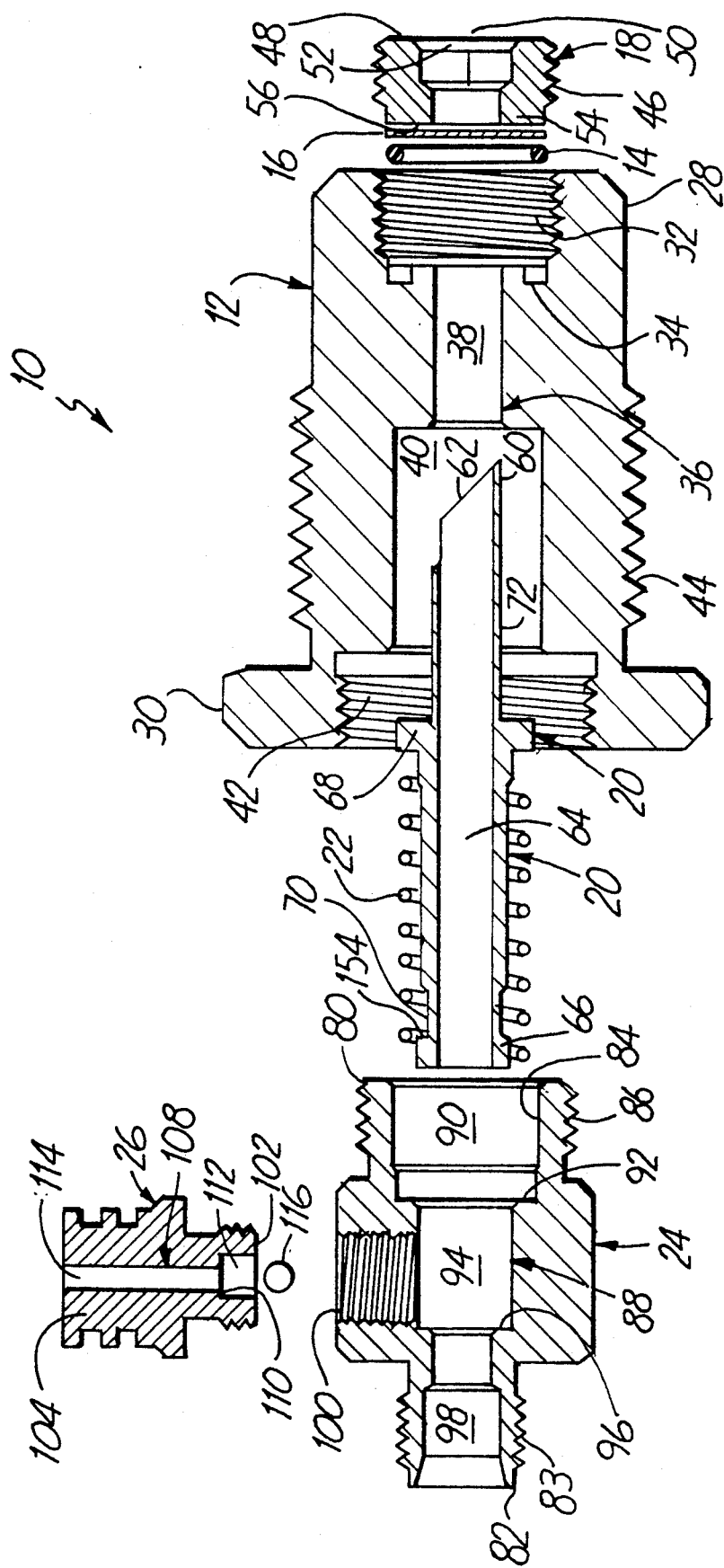
FIG. 1 is an exploded view showing the thermally activated relief valve of the present invention in cross-section.

FIG. 1 is an exploded view of a thermally activated relief valve 10 (relief valve 10) of the present invention.

Relief valve 10 includes relief body 12, O-ring 14, seal 16 and seal retainer 18. Relief valve 10 also includes a hollow bayonet 20, compression spring 22, trigger housing 24 and thermally activated trigger 26. Valve body 12 has a first end 28 and a second end 30. First end 28 is provided with a threaded opening 32. Threaded opening 32 communicates with annular notch 34 and inner channel 36. Inner channel 36 has a first narrow portion 38 and a second wider portion 40 which communicates with narrow portion 38. Wider portion 40 communicates with a second threaded opening 42 in the second end 30 of valve body 12. Valve body 12 also has a threaded exterior surface 44. Surface 44 is provided so that valve body 12 can be threaded into a threaded opening in a compressed gas storage cylinder (shown in FIG. 2).

O-ring 14 is inserted into annular notch 34 in valve body 12. Then, seal 16 is inserted into opening 32 so that it rests against O-ring 14. Seal retainer 18 is then threaded into opening 32 in valve body 12. Seal retainer 18 has a threaded exterior surface 46 for cooperation with threaded opening 32.

Seal 16 is a thin disc or diaphragm preferably constructed of a corrosion resistant metal such as stainless steel, Inconel or Monel. Seal 16 acts as an overpressure rupture disc, as well as a puncturable seal for the thermal relief function of valve 10.

Seal retainer 18 has, at a first end 48, an inlet 50. Inlet 50 communicates with passage 52 which extends generally along the longitudinal axis of seal retainer 18. Passage 52 extends to a second end 54 of seal retainer 18. Second end 54 is provided with a shoulder 56 which extends within opening 32 in valve body 12. When seal retainer 18 is threaded into opening 32, shoulder 56 abuts seal 16 and holds it securely against O-ring 14.

Bayonet 20 has a first end 60. First end 60 is formed at an angle to make a cutting surface 62. Bayonet 20 also has a passage 64 which extends from first end 62 to second end 66. Passage 64 is generally aligned with the longitudinal axis of bayonet 20.

Bayonet 20 is also provided with shoulder 68 and detent notch 70. Shoulder 68 has a diameter which is slightly smaller than the diameter of wider portion 40 of inner channel 36 in valve body 12. However, the diameter of shoulder 68 is larger than the diameter of narrow portion 38 of inner channel 36 in relief body 12. In addition, the portion 72 of bayonet 20 which is between first end 60 and shoulder 68, has a diameter which is smaller than the diameter of narrow portion 38 of inner channel 36. Therefore, bayonet 20 can move longitudinally within inner channel 36 with bayonet portion 7 protruding into narrow portion 38 of inner channel 36 until shoulder 68 abuts the junction between narrow portion 38 and wider portion 40 of inner channel 36 in valve body 12.

Spring 22 is a compression spring which has an inner diameter large enough to allow spring 22 to slide over second end 66 of bayonet 20. However, the inner diameter of spring 22 is smaller than the diameter of shoulder 68. Therefore, when spring 22 is slid over second end 66 of bayonet 20, it eventually abuts shoulder 68 of bayonet 20.

Trigger housing 24 has a first end 80 and a second end 82. First end 80 has an opening 84 and a threaded exterior 86. Threaded exterior 86 is sized to permit threading into threaded opening 42 of valve body 12. Opening 84 then communicates with inner channel 36 and a passage 88 which extends from first end 80 to second end 82 of trigger housing 24. Passage 88 includes inlet channel 90 which extends from opening 84 to shoulder 92. Passage 88 also includes a central channel 94 which extends from shoulder 92 to a second shoulder 96. Passage 88 then continues through an outlet channel 98 to second end 82 of trigger housing 24.

Inlet channel 90 has an inner diameter which is slightly larger than the outer diameter of spring 22. Central channel 94 has an inner diameter which is smaller than the outer diameter of spring 22, but which is larger than the portion of bayonet 20 which extends from shoulder 68 to second end 66. Therefore, when first end 80 is threaded, by threaded surface 86, into threaded opening 42 of relief body 12, spring 22 abuts shoulder 92. However, upon compression of spring 22, the portion of bayonet 20 extending between second end 66 and shoulder 68 of bayonet 20 can be moved into central channel 94.

Central channel 94 communicates with a threaded opening 100. Threaded opening 100 is generally perpendicular to passage 88 which extends along the longitudinal axis of trigger housing 24. Thus, detent notch 70 in bayonet 20 can be inserted, through the compression of spring 22 against shoulder 92, into inner channel 94 in general alignment with threaded opening 100.

Thermal trigger 26 has a first end 102 and a second end 104. First end 102 is provided with a threaded exterior 106 sized to permit threading into threaded opening 100 of trigger housing 24. Thermal trigger 26 has a channel 108 extending generally along its longitudinal axis from first end 102 to second end 104. Shoulder 110 divides the channel generally into a first channel 112 and a second channel 114.

Thermal trigger 26 is also provided with a ball bearing 116 sized to permit insertion into first channel 112. However, ball bearing 116 is large enough so that it abuts shoulder 110 and cannot pass into second channel 114. When threaded surface 106 of first end 102 of thermal trigger 26 is threaded into opening 100 of trigger housing 24, and when compression spring 22 is compressed between shoulder 68 of bayonet 20 and shoulder 92 of trigger housing 24, detent notch 70 of bayonet 20 is in general alignment with thermal trigger 26 so that ball bearing 116 can come to rest within detent notch 70. If ball bearing 116 were held in such a position with, for example, a eutectic material filled into channels 112 and 114 of thermal trigger 26, ball bearing 116 would thereby hold bayonet 20 within trigger housing 24 maintaining spring 22 in its compressed position.

Figure 2:
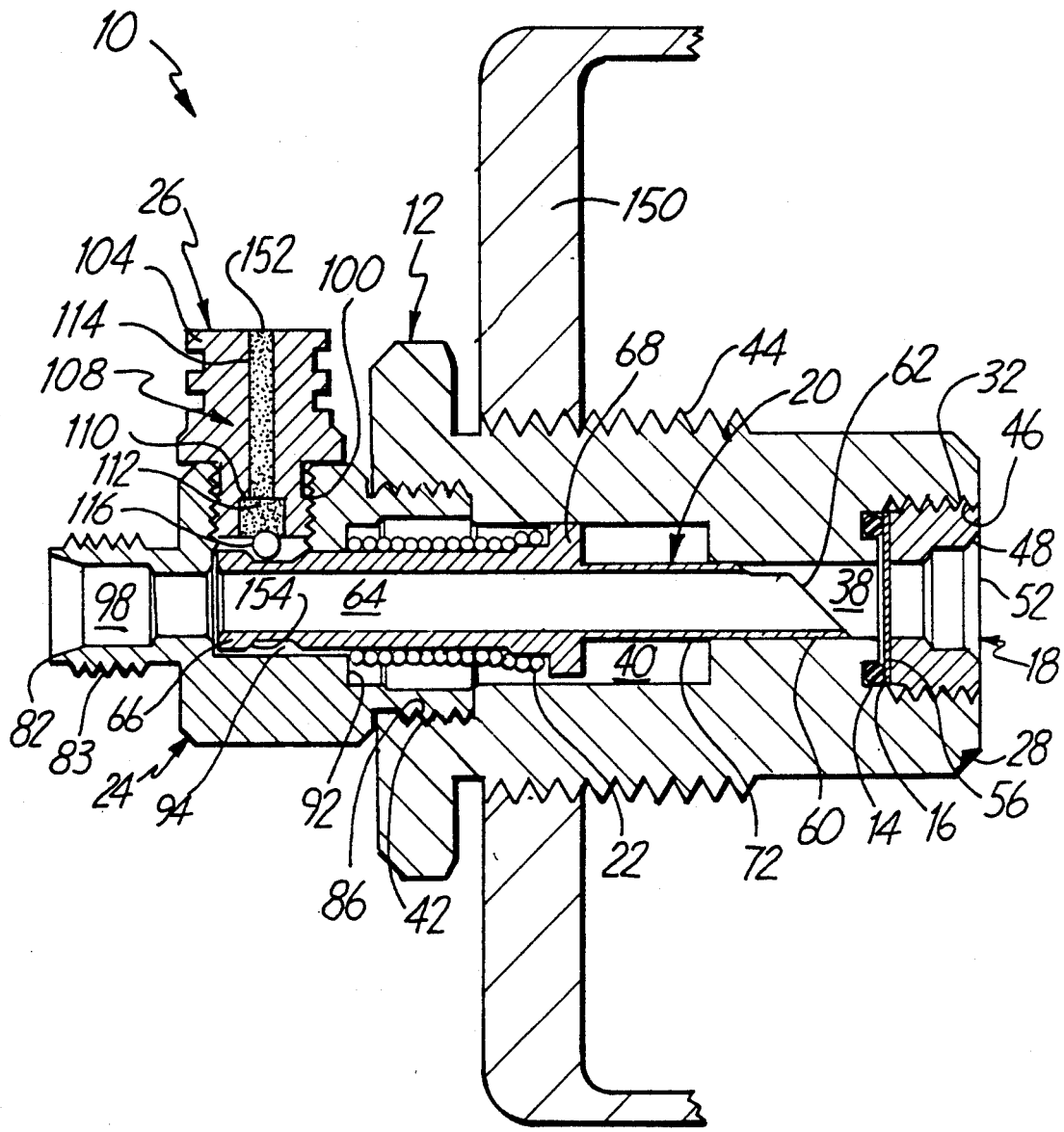
FIG. 2 is a cross-sectional view of the thermal/pressure relief valve of the present invention shown assembled to a cylinder (pressure vessel).

For a better illustration of the operation of relief valve 10, FIG. 2 shows a cross-sectional view of relief valve 10 of the present invention in assembled form. Threaded surface 44 of relief body 12 is shown threaded into an opening in compressed gas storage cylinder 150. FIG. 2 shows that there is a passage extending generally along the longitudinal axis of the assembled relief valve 10 starting at opening 50 in seal retainer 18 and extending to second end 82 of trigger housing 24. The passage is in communication with the interior of cylinder 150 and is blocked only by seal 16. Thus, if seal 16 were pierced, the passage would open and allow fluid pressure to escape from cylinder 150 through valve 10.

In operation, valve 10 is assembled as shown in FIG. 2 with support spring 22 compressed and with detent notch 70 moved back into alignment with ball bearing 116 of thermal trigger 26. Then, molten eutectic metal is poured into thermal trigger 26 filling up channels 112 and 114. Then, the eutectic 152 is allowed to cool and harden. With the hardened eutectic metal in place, ball bearing 116 is held within detent notch 70 of bayonet 20. Thus, ball bearing 116 holds spring 22 in its compressed position between shoulder 68 of bayonet 20 and shoulder 92 of trigger housing 24.

In a preferred embodiment, the tolerance between first channel 112 and ball bearing 116 is close, and ball bearing 116 is held in first channel 112 with slightly over half of ball bearing 116 within first channel 112. First end 102 is crimped slightly (by swaging) so that ball bearing 116 is captured in first channel 112 between first end 102 and shoulder 110. This prevents the molten eutectic material 152 from forcing ball bearing 116 out of first channel 112 or leaking past ball bearing 116 during filling of channels 114 and 112. It also assures a consistent position of ball bearing 116 and prevents ball bearing 116 from floating in the heavier eutectic material 152 and therefore moving in first channel 112 during the filling process.

Figure 3:
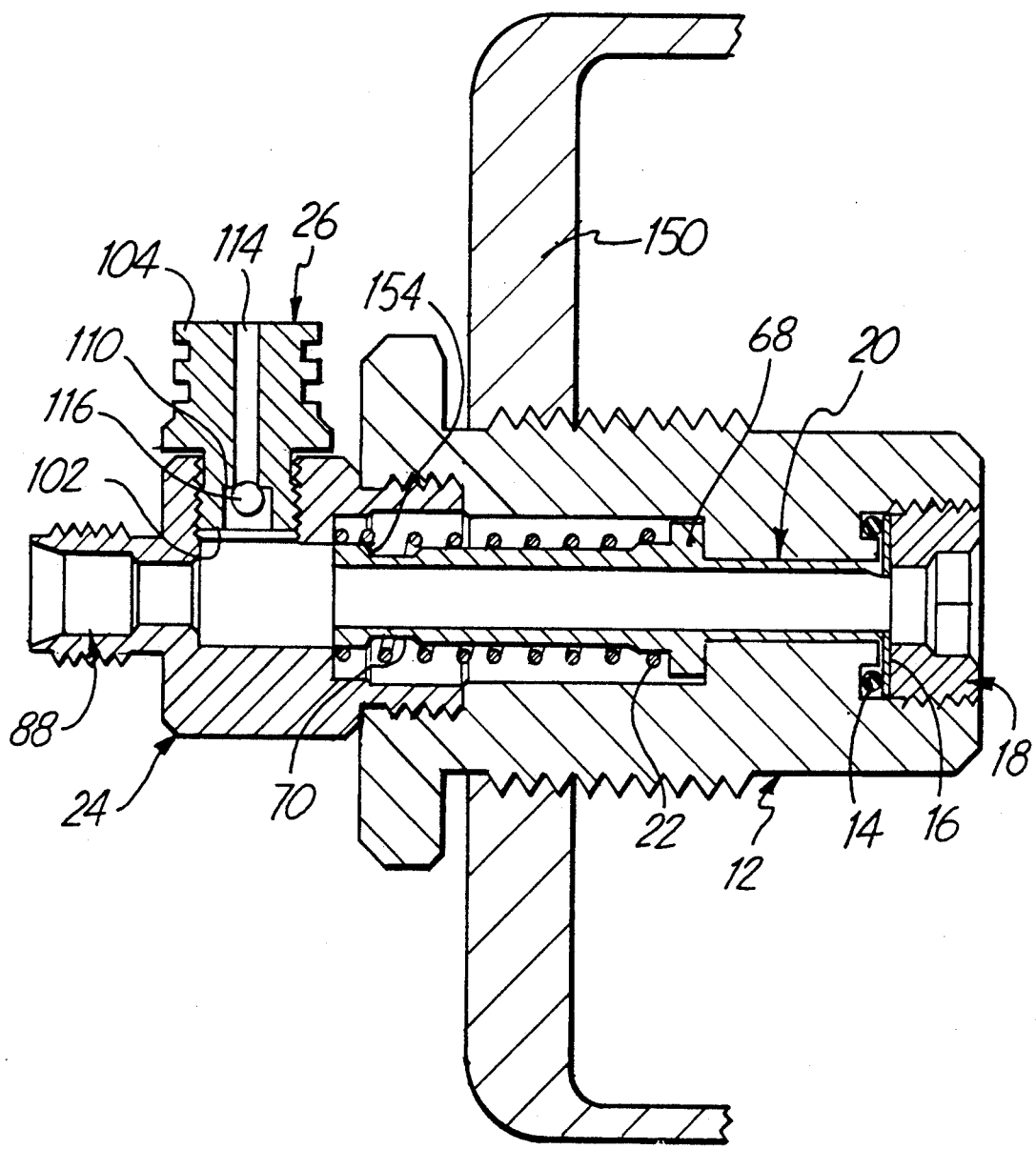
FIG. 3 is a cross-sectional view of the thermal/pressure relief valve of the present invention shown assembled to a cylinder wherein the relief valve is in the thermally triggered position.

Detent notch 70 is provided with a ramped annular surface 154. In this preferred embodiment, surface 154 is ramped at a 15° angle. Therefore, the pressure exerted by spring 22 against shoulder 68 causes an upward force to be exerted against ball bearing 116. When the eutectic substance 152 reaches its melting temperature, it liquifies. In its liquid state, eutectic substance 152 no longer holds ball bearing 116 securely in detent notch 70. FIG. 3 shows that the upward force exerted on ball bearing 116 by compression spring 22 and ramped surface 154 causes ball bearing 116 to move into channel 112 and out of detent notch 70 on bayonet 20. This allows compression spring 22 to expand and push against shoulder 68 thereby driving cutting edge 62 of bayonet 20 through seal 16. By piercing seal 16, bayonet 20 opens the gas passage allowing communication between the interior of cylinder 150 and the second end 82 of trigger housing 24. Second end 82 of trigger housing 24 is provided with a threaded exterior surface 83 for being coupled to a venting hose or other suitable container or device.

It should be noted is that ball bearing 116 is its own check valve. In other words, since ball bearing 116 is too large to pass into channel 114, it rests against shoulder 110 to prevent any gas communication between the passage through valve 10 and the second end 104 of thermal trigger 26. The second end 66 of bayonet 20 initially drives ball bearing toward shoulder 110. Then, when communication is opened within valve 10, the gas pressure from cylinder 150 maintains ball bearing 116 against shoulder 110 to prevent communication with the second end 104 of thermal trigger 26. In an alternative embodiment, channel 112 could be tapered instead of using shoulder 110. Therefore, the check valve action would be maintained since ball bearing 116 would be driven up into the tapered portion.

The arrangement of valve 10 provides several advantages. First, the detent arrangement of thermal trigger 26 is an effective and inexpensive mechanism which provides its own check valve. This eliminates the need for O-ring seals on the bayonet. Thus, associated problems such as O-ring sticking or drag, are eliminated. Also, the eutectic metal 152 is not exposed to the gas pressure in container 150. Therefore, the problem of plastic flow or creep is essentially eliminated. This greatly extends the life expectancy and reliability of valve 10.

In this preferred embodiment, surface 30 of valve body 12, the exterior surface of trigger housing 24 and a portion of the exterior surface of thermal trigger 26 are hexagonally shaped. This provides ease of assembly using a properly sized wrench. Except for the small external portion of the thermal trigger 26 requiring a hex shape for ease of installation into trigger housing 24, the remainder is configured with concentric ribs for rapid heat absorption when exposed to a flame.

In addition, valve 10 provides over pressure protection. If the gas pressure in cylinder 150 rises above a predetermined pressure, seal 16 ruptures, which opens a relief passage through passage 64 of bayonet 20 and passage 88 of trigger housing 24.

In the preferred embodiment, relief body 12 and trigger housing 24 are stainless steel or aluminum, and thermal trigger 26 is plated brass. The eutectic metal used will vary with the desired temperature threshold. Those skilled in the art will be familiar with the desired eutectics.

As stated earlier, the combination PRD/TRD of the present invention is ideally suited for vehicular systems applications where crash proofing is desirable. In preferred embodiments, the PRD/TRD of the present invention is used in combination with the crash proof solenoid controlled valve described in the previously-mentioned copending application, and that description is incorporated by reference. The PRD/TRD and the solenoid controlled valve are mounted at opposite ends of the cylinder or at the same end, depending upon the particular application. In one embodiment, the PRD/TRD is mounted in the valve body of the solenoid controlled valve.

Although the present invention has been described with reference to preferred embodiments, workers skilled in the art will recognize that changes may be made in form and detail without departing from the spirit and scope of the invention.

What is claimed is:

1. A thermally activated relief valve for use with a pressure vessel containing gas within its interior, comprising:

a valve body having a fluid passage for communication with the interior of the container when the valve body is coupled to the container;

a diaphragm sealing the fluid passage, the diaphragm having a first side exposed to the interior of the container and a second side opposite the first side;

a hollow bayonet mounted to the valve body on the second side of the diaphragm, the hollow bayonet having a first end for piercing the diaphragm and a second end provided with a detent notch;

bias means, coupled to the bayonet, for biasing the bayonet toward the diaphragm; and thermal trigger means, operably coupled to the bayonet, for holding the bayonet in spaced relation to the diaphragm prior to the thermal trigger means reaching a predetermined temperature threshold, and for releasing the bayonet so that the bayonet is moved toward the diaphragm by the bias means and so that the bayonet pierces the diaphragm when the thermal trigger means reaches the predetermined temperature threshold, the trigger means comprising a trigger housing having an inner chamber, a detent movable within the inner chamber of the trigger housing, and a thermally sensitive eutectic substance in the inner chamber of the trigger housing wherein the eutectic substance is in a solid stage when its temperature is below the predetermined temperature threshold so that it biases the detent into the detent notch of the hollow bayonet, and wherein the eutectic substance is in a liquid state when its temperature reaches the predetermined temperature threshold so that the detent is allowed to move within the inner chamber of the trigger housing away from the detent notch.

2. The thermally activated relief valve of claim 1 wherein the hollow bayonet comprises:
a ramped surface adjacent the detent notch configured so that force exerted by the bias means on the hollow bayonet causes a drive force on the detent driving the detent up the ramp and out of the detent notch of the hollow bayonet when the thermally sensitive substance is in the liquid state.

3. The thermally activated relief valve of claim 1 wherein the bias means comprises:
a compression spring.

4. The thermally activated relief valve of claim 1 wherein the diaphragm is a rupturable disc which ruptures when gas pressure in the vessel exceeds a predetermined pressure to provide a relief passage from the vessel through the ruptured disc and through the hollow bayonet.

5. A thermally activated relief valve for releasing fluid pressure from a fluid container when the relief valve reaches a predetermined temperature threshold, the relief valve comprising:
a valve housing body having a fluid passage with an inlet for communication with the interior of the container, and an outlet;
a seal, disposed within the fluid passage between the inlet and the outlet, sealing the fluid passage;
a hollow bayonet mounted with the fluid passage between the seal and the outlet and movable between a first position, wherein the bayonet is spaced from the seal, and a second position, wherein the bayonet is piercing the seal;
a thermal trigger disposed generally between the seal and the outlet causing the bayonet to move from the first position to the second position when the thermal trigger reaches the predetermined temperature threshold, the thermal trigger comprising a spring mounted within the valve housing biasing the hollow bayonet toward the seal; and
a detent mechanism detaining a hollow bayonet in the first position when the detent mechanism is below the predetermined temperature threshold and releasing the hollow bayonet to move to the second position, under force of the spring, when the detent mechanism reaches the predetermined temperature threshold, the detent mechanism comprising a detent housing having an inner chamber, a detent movable within the inner chamber of the detent housing between a first position wherein the detent extends from the inner chamber of the detent housing to detain the hollow bayonet in its first position, and a second position wherein the detent is substantially entirely within the inner chamber of the detent housing thereby releasing the hollow bayonet to allow the hollow bayonet to move to the second position, and a temperature sensitive substance within the inner chamber of the detent housing, the temperature sensitive substance being in a solid state to hold the detent in its first position when the temperature sensitive substance is below the predetermined temperature threshold and in a liquid state allowing the detent to move to its second position when the temperature sensitive substance reaches the predetermined temperature threshold.

6. The thermally activated relief valve of claim 5 wherein the detent mechanism includes:
check valve means for functioning as a check valve after the hollow bayonet moves to the second position.

7. The thermally activated relief valve of claim 6 wherein the hollow bayonet and the spring cooperate to provide a force on the detent biasing the detent toward its second position.

8. The thermally activated relief valve of claim 5 wherein the seal is a rupturable disc which ruptures when pressure in the container exceeds a predetermined pressure to provide a relief passage through the disc and the hollow bayonet.

9. The thermally activated apparatus for releasing fluid pressure from a fluid container, the apparatus comprising:
a valve housing having a passage;
a seal for sealing the passage, the seal having a first side exposed to the fluid pressure and a second side opposite the first side;
a hollow bayonet having a detent notch and being disposed within the passage, the bayonet being movable between a first position spaced from the seal and a second position wherein the bayonet pierces the seal;
bias means, coupled to the bayonet, for biasing the bayonet toward the second position;
a detent mounted to the valve housing and movable between a locking position wherein the detent is engaged within the detent notch on the bayonet holding the bayonet in the first position, and a released position wherein the detent is out of engagement with the detent notch so that the bias means moves the bayonet into its second position; and
a thermally sensitive material holding the detent in the locking position when the thermally sensitive material is below a temperature threshold and melting to allow the detent to move to the released position when the thermally sensitive material reaches the temperature threshold.

10. The thermally activated apparatus of claim 9 wherein the bias means cooperates with the bayonet to bias the detent toward its released position.

11. The thermally activated apparatus of claim 10 wherein the detent and the thermally sensitive material are disposed on the second side of the seal so that the detent and the thermally activated material are not exposed to the fluid pressure when the detent is in the locking position.

12. The thermally activated apparatus of claim 11 wherein the thermally sensitive material is a eutectic material which is in a solid state when its temperature is below a temperature threshold and in a liquid state when its temperature reaches the temperature threshold.

13. The thermally activated relief valve of claim 9 wherein the seal is a rupturable disc which ruptures when pressure in the container exceeds a predetermined pressure to provide a relief passage through the disc and the hollow bayonet.

* * * * *